O. HENINGER.
BRAKE SHOE KEY LOCK.
APPLICATION FILED MAR. 13, 1922.
1,435,523.
Patented Nov. 14, 1922.
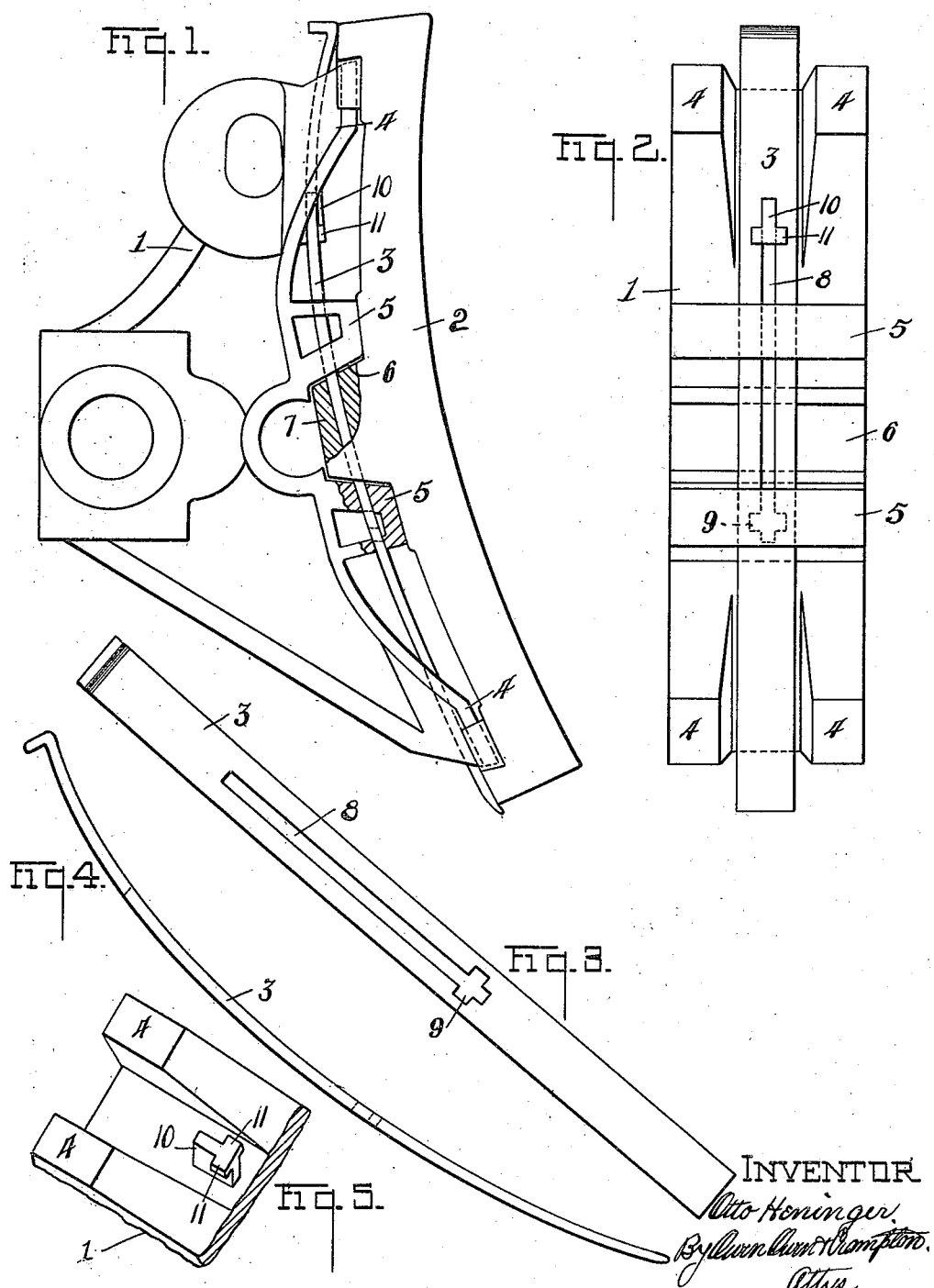

Patented Nov. 14, 1922.

1,435,523

UNITED STATES PATENT OFFICE.

OTTO HENINGER, OF TOLEDO, OHIO.

BRAKE-SHOE KEY LOCK.

Application filed March 13, 1922. Serial No. 543,340.

*To all whom it may concern:*

Be it known that I, OTTO HENINGER, a citizen of the United States, and a resident of Toledo, in the county of Lucas and State of Ohio, have made an invention appertaining to a Brake-Shoe Key Lock; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to brake heads for railway car brake equipment, and has particularly for its object the provision of simple, efficient and improved means for securing and retaining the brake shoe-holding keys in locked position.

The invention is fully described in the following specification, and while in its broader aspect it is capable of embodiment in numerous forms, a preferred embodiment thereof is illustrated in the accompanying drawings, in which,—

Figure 1 is a side elevation of a brake head, shoe and key in assembled relation with a part broken away. Fig. 2 is a face view of the brake head and key in assembled relation with the brake shoe removed. Figs. 3 and 4 are different views of the key, and Fig. 5 is a perspective fragmentary view of an end portion of the brake head showing the key engaging stud thereof.

Referring to the drawings, 1 designates a brake head of ordinary construction, 2 a brake-shoe for fitting to the head, and 3 a key for engaging the break-head and shoe in the usual manner for securing them in assembled relation, as well understood in the art.

The brake-head is provided at each end of its shoe securing face with a pair of transversely spaced lugs 4 for engagement with the ends of a brake shoe, and is provided at the central portion of its shoe receiving face with a pair of cross-lugs 5, which are spaced longitudinally of the head to form a recess 6, having tapered side walls therebetween. The brake shoe 2 bears at its inner side against the end and center lugs 4 and 5 and is provided centrally of its ends with a cross-lug 7 for fitting into the recess 6 of the head, as shown. The cross lugs 5 and 7 of the head and shoe are provided therethrough longitudinally of the head with aligned key receiving openings so that a key 3 may be inserted therein to secure the parts in assembled relation, as is common in devices of this character.

The key locking means embodying the present invention consists in providing the key 3, which is an elongated strip preferably of resilient material such as steel, with a slot 8 extending from near the head end thereof preferably past its center and provided intermediate its ends and preferably adjacent to its other end with a cross slot or transverse enlargement 9, so that the slot in the form shown is of cross shape. A key engaging stud 10 is provided on the inner side of the brake head near one end thereof and is of a width to adapt it to enter the key slot 8 and to have free longitudinal sliding engagement therewith. The stud is provided at its outer or free end with oppositely projecting ears 11 so that its outer end in the present instance is of T-form complemental to the T-form of key slot to adapt it to be engaged with the slot upon an insertion of the ears 11 through the side enlargements of the slot. When the ears 11 have been inserted through the slot enlargement 9 the key may then be longitudinally moved relative to the stud with the ears in lapping engagement with the outer side walls of the key slot to prevent a separation or disengagement of the key from the stud, except when the ears 11 are in register with the enlargement 9 of the slot.

It is evident that I have provided a simple and efficient key holding means, the parts of which are capable of easy interengagement upon an assembly of the parts and acts to efficiently retain the key in locked relation to the brake head and shoe.

I wish it understood that my invention is not limited to any construction, arrangement or form of the parts illustrated, as it is capable of numerous modifications and changes without departing from the spirit of the claims.

Having thus described my invention, what I claim as new, and desire to secure by Letters Patent, is,—

1. A brake shoe key lock comprising in combination, a brake-head having a stud on its brake-shoe receiving face, and a key for securing a brake-shoe to the head and having a longitudinally extending slot which is adapted to receive the stud and cooperate therewith to retain the key in engagement with the head except when the key is at a predetermined point in its assembling movement.

2. In combination, a brake-head having a stud projecting from its brake-shoe engaging face near one end thereof, said stud having an enlargement at its outer end portion, a brake-shoe, and a key adapted to be inserted into holding engagement with the brake-head and shoe longitudinally between portions of the same and having a longitudinally extending slot with an enlargement therein for the projection of the stud enlargement therethrough after which the key may be moved lengthwise of the engaged stud with the stud enlargement in holding engagement with the outer side of the key.

3. In combination, a brake-head, a brake-shoe, and a key insertable between the head and shoe longitudinally thereof and in holding interengagement therewith, the brake-head having a stud projecting from its shoe engaging face and the key having a longitudinally extending slot for receiving the stud during predetermined longitudinal movements of the key relative to the head, the key slot having an enlargement in a side wall thereof and the stud having a laterally projecting ear at its outer end for projecting through the slot enlargement and coacting with a marginal side wall portion of the slot to retain the key and stud in interengagement during predetermined portions of relative movements thereof.

In testimony whereof I have hereunto signed my name to this specification.

OTTO HENINGER.